US012601859B2

(12) United States Patent
Zhou et al.

(10) Patent No.: US 12,601,859 B2
(45) Date of Patent: Apr. 14, 2026

(54) DISPLAY ASSEMBLY INCLUDING A BONDING MEMBER AND SEAL SPACE, DISPLAY DEVICE AND ASSEMBLY METHOD THEREFOR

(71) Applicants: GUANGZHOU SHIYUAN ELECTRONICS CO., LTD., Guangzhou (CN); GUANGZHOU SHIRUI ELECTRONICS CO., LTD., Guangzhou (CN)

(72) Inventors: Kesong Zhou, Guangzhou (CN); Heng Yu, Guangzhou (CN)

(73) Assignees: GUANGZHOU SHIYUAN ELECTRONICS CO., LTD., Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 739 days.

(21) Appl. No.: 17/430,821

(22) PCT Filed: Dec. 19, 2019

(86) PCT No.: PCT/CN2019/126549
§ 371 (c)(1),
(2) Date: Aug. 13, 2021

(87) PCT Pub. No.: WO2020/168805
PCT Pub. Date: Aug. 27, 2020

(65) Prior Publication Data
US 2022/0163695 A1     May 26, 2022

(30) Foreign Application Priority Data

Feb. 19, 2019   (CN) .......................... 201910124899.0
Jul. 24, 2019   (CN) .......................... 201910673688.2

(51) Int. Cl.
*G02B 1/14*     (2015.01)
*G02B 5/30*     (2006.01)
(Continued)

(52) U.S. Cl.
CPC ............. *G02B 1/14* (2015.01); *G02B 5/3025* (2013.01); *G02F 1/133331* (2021.01); *G02F 1/1339* (2013.01)

(58) Field of Classification Search
CPC ......................... G02F 1/133331; G02F 1/1339
See application file for complete search history.

(56) References Cited

U.S. PATENT DOCUMENTS

2009/0261694 A1   10/2009   Yamanaka
2010/0164885 A1 *  7/2010   Hosorogi .............. G06F 3/0412
                                                          445/24
(Continued)

FOREIGN PATENT DOCUMENTS

CN        102566824 A      7/2012
CN        105138191 A     12/2015
(Continued)

OTHER PUBLICATIONS

Notice of Preliminary Rejection Received for Korean Patent Application No. 10-2021-7030299, mailed on Aug. 24, 2023, 7 pages.
(Continued)

*Primary Examiner* — Lauren Nguyen
(74) *Attorney, Agent, or Firm* — Zhong Law, LLC

(57)     ABSTRACT

A display assembly includes a display panel, a transparent protective layer, and bonding member, in which the bonding member is arranged around an edge of the display panel, one surface of the bonding member is fixedly connected with the display panel, another surface of the bonding member is fixedly connected with the transparent protective layer, the display panel and the transparent protective layer are formed
(Continued)

with a bonding area and a gap area, the gap area surrounds the bonding area, and the bonding member surrounds the gap area.

34 Claims, 6 Drawing Sheets

(51) Int. Cl.
    *G02F 1/1333*     (2006.01)
    *G02F 1/1339*     (2006.01)

(56)            References Cited

U.S. PATENT DOCUMENTS

| | | | | |
|---|---|---|---|---|
| 2011/0123768 A1* | 5/2011 | Takeda | ..................... | B29C 41/24 |
| | | | | 536/63 |
| 2011/0135922 A1* | 6/2011 | Joseph | ................... | C09J 153/00 |
| | | | | 428/522 |
| 2013/0194749 A1* | 8/2013 | Choi | ........................ | H05K 5/03 |
| | | | | 361/679.01 |
| 2014/0354937 A1* | 12/2014 | Moro | ................ | G02F 1/133502 |
| | | | | 349/162 |
| 2016/0041421 A1* | 2/2016 | Morioka | ........... | G02F 1/133308 |
| | | | | 349/12 |
| 2017/0363803 A1* | 12/2017 | Nakamori | ......... | G02F 1/133314 |

FOREIGN PATENT DOCUMENTS

| | | | | | |
|---|---|---|---|---|---|
| CN | 105158951 | A | 12/2015 | | |
| CN | 206149342 | U | 5/2017 | | |
| CN | 20-6494167 | * | 9/2017 | ............ | B65B 33/02 |
| CN | 206494167 | U | 9/2017 | | |
| CN | 107422518 | A | 12/2017 | | |
| CN | 107797318 | A | 3/2018 | | |
| CN | 110333630 | A | 10/2019 | | |
| CN | 211826839 | U | 10/2020 | | |
| DE | 102008031356 | A1 | 1/2010 | | |
| JP | H973072 | A | 3/1997 | | |
| JP | 2009109993 | A | 5/2009 | | |
| JP | 2010013648 | A | 1/2010 | | |
| JP | 2010211185 | A | 9/2010 | | |
| JP | 2011252095 | A | 12/2011 | | |
| JP | 2014130194 | A | 7/2014 | | |
| JP | 2015187618 | A | 10/2015 | | |
| JP | 201836511 | A | 3/2018 | | |
| KR | 20100004869 | A | 1/2010 | | |
| KR | 20140128151 | A | 11/2014 | | |
| TW | M273012 | U | 8/2005 | | |
| WO | 2009078195 | A1 | 6/2009 | | |
| WO | 2016042755 | A1 | 3/2016 | | |
| WO | WO-2016-042755 | * | 3/2016 | ........... | G02F 1/1333 |

OTHER PUBLICATIONS

Japanese Application No. 2021-548257, Office Action mailed May 5, 2023, 16 pages.
International Application No. PCT/CN2019/126549, International Search Report and Written Opinion mailed Feb. 21, 2020, 13 pages.
Indian Application No. 202117041517, Examination Report mailed Jan. 31, 2023, 5 pages.
Notice of Reasons for Refusal Received for Japanese Patent Application No. 2021-548257, mailed on Sep. 12, 2023, 8 pages with translation.
Examination report Received for Australian Patent Application No. 2019430812, mailed on Sep. 9, 2022, 3 pages.
Office Action Received for European Patent Application No. EP135919, mailed on Jan. 2, 2024, 6 pages.
First Office Action and Search Report Received for Chinese Patent Application No. 201910673688.2, mailed on Mar. 29, 2024, 18 pages.
Examination communication received for EP Application No. 19916111.8, dated Jun. 24, 2025.

* cited by examiner

390

320

340

310

330

390

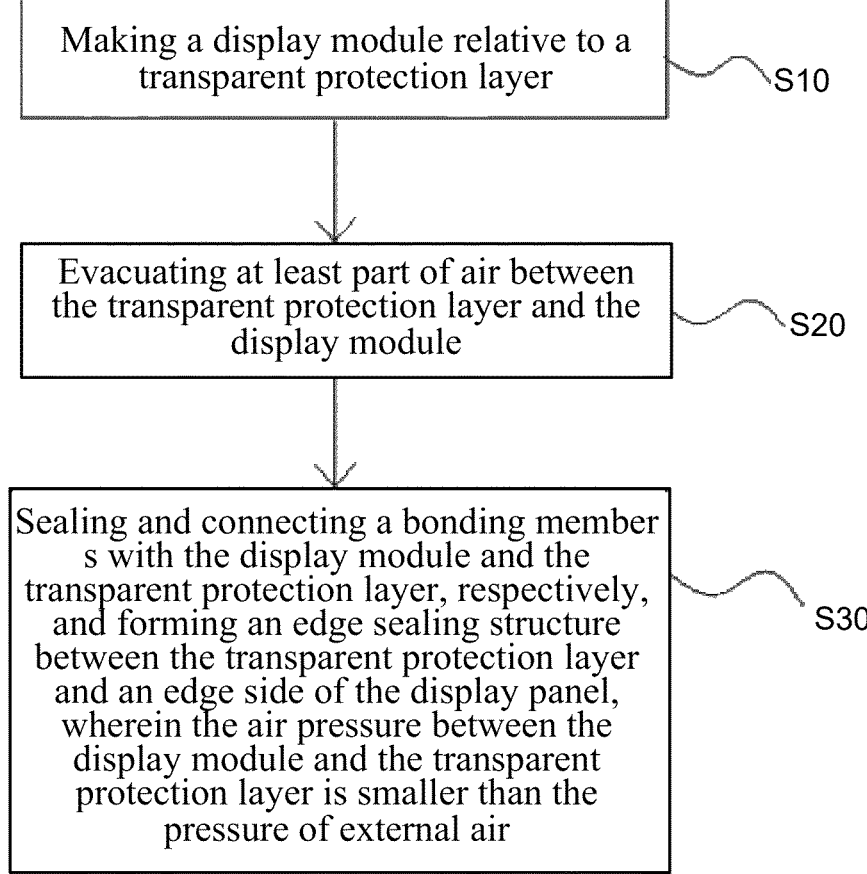

Making a display module relative to a
transparent protection layer     S10

Evacuating at least part of air between
the transparent protection layer and the
display module     S20

Sealing and connecting a bonding member
s with the display module and the
transparent protection layer, respectively,
and forming an edge sealing structure     S30
between the transparent protection layer
and an edge side of the display panel,
wherein the air pressure between the
display module and the transparent
protection layer is smaller than the
pressure of external air

Fig. 6

DISPLAY ASSEMBLY INCLUDING A BONDING MEMBER AND SEAL SPACE, DISPLAY DEVICE AND ASSEMBLY METHOD THEREFOR

CROSS-REFERENCE TO RELATED APPLICATIONS

The present application is the US national stage of PCT/CN2019/126549 filed on Dec. 19, 2019, which claims the priority benefit of Chinese Patent Application No. 201910673688.2 filed to China National Intellectual Property Administration (CNIPA) on Jul. 24, 2019, and to Chinese Patent Application No. 201910124899.0 to CNIPA on Feb. 19, 2019, and the entire contents of the above-mentioned applications are incorporated by reference in the present application.

TECHNICAL FIELD

The present disclosure relates to the field of display devices, and in particular to a display assembly, a display device and an assembling method thereof.

BACKGROUND

Existing display devices are widely used in people's lives. In the process of using, transporting, carrying, and moving display devices, quality problems such as broken screen, water mist, abrasion, and light leakage often occur. For large-format display devices, quality problems such as broken screens, water mist, abrasion, and light leakage are even more prominent. The display panel is one of the key components of the display device, and the cost ratio is generally about 30% or even higher of the entire display device. The unit price of each display panel ranges from hundreds of Yuan to tens of thousands of Yuan. For manufacturers and sellers of display devices, if the above-mentioned quality problems of display devices occur, it is necessary to postpone delivery, return or replace the corresponding display panel, which greatly increases the manufacturing and selling cost of display devices, and also adversely impacts the delivery time, reputation, etc. of both manufacturers and sellers of display devices.

In a display device, a transparent protective layer (such as a glass screen or other transparent materials) is provided in front of the display panel for protection. The display panel and the transparent protective layer are generally fixed in the following manner: the transparent protective layer and the display panel are separately fixed, the front and rear sides of the display panel are respectively fixed and supported with an iron front frame and a module rubber frame through foam, the top and bottom portions of the display panel are fixed with a module rubber frame through a silicone pad, the iron front frame and the transparent protective layer are sealed by foam, the transparent protective layer is fixed on the front frame of a housing of the display device, and a gap of 3-8 mm exists between the transparent protective layer and the display panel.

The above-mentioned structure is highly correlated with the quality problems such as broken screen, water mist, abrasion and light leakage of the above-mentioned display device:

1. The display panel is fixed by foam between the module rubber frame and the iron front frame. Because the foam has poor firmness, and a large gap exists between the transparent protective layer and the display panel, the display panel as a flexible and fragile object during the transportation and carrying process, is prone to shaking, and the display panel collides with the silicone pad, the module rubber frame or the transparent protective layer, causing broken screen.

2. The gap between the transparent protective layer and the display panel is large, generally in the range of 3 mm to 8 mm. Because of the large gap and the use of foam sealing, the sealing cannot achieve air tight, and the external water vapor can easily enter into the gap between the transparent protective layer and the display panel, causing water mist to be generated on the transparent protective layer and the display panel, thus impacting the display quality.

3. Additionally, because the gap between the display panel and the transparent protective layer is too wide, the display panel can move relative to the transparent protective layer due to shaking and deformation, causing abrasion to the display panel. In particular, some transparent protective layers include double AG surfaces having a rough surface of the transparent protective layer facing the display panel. It is more likely to cause abrasion to the display panel during the relative movement between the display panel and the transparent protective layer. In addition, because a wide gap exists between the transparent protective layer and the display panel, the edge of the gap between the display panel and the transparent protective layer is sealed using foam. Because the sealing surface is large and the sealing of the foam is not very effective, the overall sealing effect is not good enough, allowing foreign matters (such as dust) entering the gap. The foreign matters will be adsorbed onto the surface of the transparent protective layer and the surface of the display panel. During the relative movement between the display panel and the transparent protective layer, the display panel is more likely to be abraded.

4. Because the installation and fixation of the display panel are unstable and the external force applied to the display panel is uneven, display defects such as light leakage, whitening during display often occur.

Taking into account the quality problems of the display device, the inventors realized that, when fully fitting the display panel with the transparent protective layer using OCA glue (that is, the whole surface of the display panel facing the transparent protective layer is coated with OCA glue, and the display panel is fit with the transparent protective layer through OCA glue), it is possible to avoid the above-mentioned quality defects to a certain extent, but this manner also has the following defects:

1. The price of OCA glue is relatively expensive. For fully fitting the display panel with the transparent protective layer, the cost of each display device will increase by about 800 Yuan to 1,000 Yuan, which will significantly increase the production cost of the product.

2. Because OCA glue has strong pasting performance, the display panel and the transparent protective layer as a whole exhibit rigidity due to the paste. When being impacted by an external force, the external force subjected to the display panel cannot be absorbed, which may cause the display panel easy to break. Or, the display panel cannot transmit the impact force to other force bearing points, causing an uneven force, which easily damages the display panel at the force bearing points, causing light leakage.

3. When the display panel is broken or damaged, it is not easy to peel the display panel from the transparent protective layer. As a result, the transparent protective layer cannot be reused.

4. The display panel and the transparent protective layer need to be fully pasted, and the technical requirement for the installation process is high, which further increases the production cost.

Therefore, how to effectively solve the quality defects of the display device such as broken screen, water mist, abrasion, and light leakage without increasing the production cost requires research and innovative solutions.

SUMMARY

The present disclosure provides a display assembly, a display device and an assembling method thereof, which effectively solves at least one of the problems of broken screen, water mist, abrasion and light leakage in the display assembly of the display device, while reducing the production cost of the display device.

The present disclosure provides a display assembly.

The display assembly comprises a display panel, a transparent protective layer and a bonding member, wherein the bonding member is arranged around an edge of the display panel, one surface of the bonding member is fixedly connected with the display panel, the other surface of the bonding member is fixedly connected with the transparent protective layer, the display panel and the transparent protective layer are formed with a bonding area and a gap area, the gap area surrounds the bonding area, and the bonding member surrounds the gap area.

The present disclosure further provides another display assembly.

The display assembly comprises a display panel, a transparent protective layer and a bonding member, wherein the bonding member is arranged around an edge of the display panel, one surface of the bonding member is fixedly connected with the display panel, the other surface of the bonding member is fixedly connected with the transparent protective layer, the bonding member, the display panel and the transparent protective layer construct a sealed space, and in the sealed space, the display panel and the transparent protective layer are mutually adsorbed.

The present disclosure further provides another display assembly.

The display assembly comprises a display panel, a transparent protective layer and a bonding member, wherein the bonding member is arranged between the transparent protective layer and an edge of the display panel, and the edge of the display panel constitutes a first fixed connection portion for fixedly connecting the display panel and the transparent protective layer, the first fixed connection portion constructs a sealed space for the display panel and the transparent protective layer; in the sealed space, the transparent protective layer and the display panel are formed with a second fixed connection portion, an interspace area is formed on the outer periphery of the second fixed connection portion, and the interspace area is arranged around the second fixed connection portion.

The present disclosure further provides another display assembly.

The display assembly comprises a display panel, a transparent protective layer and a bonding member, wherein one surface of the bonding member is fixedly connected to an edge of the display panel, the other surface is fixedly connected with the transparent protective layer, a sealing structure is formed between the transparent protective layer and the edge of the display panel; the display panel and the transparent protective layer are relatively bent from the edge sealing structure to a middle part of the display panel to form a bending portion, and in a sealed space constructed by the display panel and the transparent protective layer in the edge sealing structure, an interspace area is formed by the display panel and the transparent protective layer.

The present disclosure further provides another display assembly.

The display assembly comprises a display panel, a transparent protective layer and a bonding member, wherein the bonding member is arranged around an edge of the display panel, one surface of the bonding member is fixedly connected with the display panel, the other surface of the bonding member is fixedly connected with the transparent protective layer, the bonding member, the display panel and the transparent protective layer construct a sealed space, a thickness of the bonding member makes the display panel and the transparent protective layer bend toward each other due to van der Waals force, and in a state that the display assembly is placed vertically, the van der Waals force between the display panel and the transparent protective layer is balanced with a tension generated by air in the sealed space.

The present disclosure further provides a display device.

The display device comprises a display assembly described as any one of the above-mentioned display assemblies and a housing, wherein the transparent protective layer of the display assembly and the housing are fixed to each other, and the display panel of the display assembly is located in the housing.

A side edge of the display panel is suspended. The display panel is not in contact with the housing, so as to prevent the display panel from a collision with the housing that causes a screen of the display panel to break.

The present disclosure further provides an assembling method of a display assembly.

The assembling method comprises following steps:

placing a display panel facing to a transparent protective layer, evacuating at least part of air between the transparent protective layer and the display panel, and fixedly connecting a bonding member with the display panel and with the transparent protective layer respectively, and forming a sealing structure between the transparent protective layer and an edge of the display panel, wherein the display panel and the transparent protective layer are adsorbed with each other to form a bonding area and a gap area, the gap area surrounds the bonding area, and the bonding member surrounds the gap area.

The present disclosure further provides an assembling method of a display device, comprising following steps of: acquiring a display assembly assembled as any one of the above-mentioned display assembling methods, placing a display panel of the display assembly in a housing, and fixing a transparent protective layer of the display assembly and the housing to each other.

After the transparent protective layer of the display assembly and the housing are fixed to each other, a side edge of the display panel is suspended relative to the housing.

The display assembly, the display device and the assembling method thereof provided by the present disclosure effectively solve at least one of the problems of broken screen, water mist, abrasion and light leakage in the display assembly of the display device while reducing the production cost of the display device.

BRIEF DESCRIPTION OF THE DRAWINGS

FIG. 6 is a flowchart of assembling method of a display assembly according to an embodiment of the present disclosure.

DESCRIPTION OF DRAWING REFERENCE SIGNS

10, Display assembly; 100, Display panel; 200, Transparent protective layer; 300, Bonding member; 800, gap area; 110, Second bending portion; 310, Styrofoam layer; 320, First bonding layer; 330, Second bonding layer; 340, Reinforcement layer; 350, First convex portion; 360, First concave portion; 370, Second convex portion; 380, Second concave portion; 390, Isolation layer; 400, Side frame; 500, Back plate; 600, Modular rubber frame; 410, First slot; 510, First clamping portion; 420, First accommodation groove; 430, Touch PCB board; 440, Accommodation space; 450, Second slot; 460, Filter part; 700, Foam; 900, Bonding area.

DESCRIPTION OF THE PREFERRED EMBODIMENTS

Hereinafter, the embodiments of the present disclosure will be described in detail.

Figure 1:
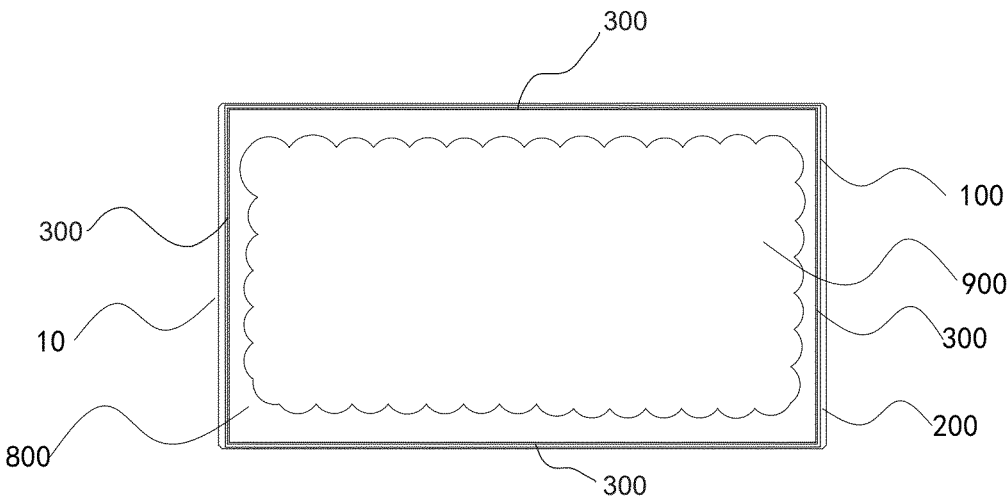
FIG. 1 is a sectional view of a display assembly according to an embodiment of the present disclosure.

As shown in FIG. 1, this embodiment discloses a display assembly 10. The display assembly 10 includes a display panel 100, a transparent protective layer 200 and a bonding member 300. The bonding member 300 is arranged around an edge of the display panel 100. One surface of the bonding member 300 is fixedly connected to an edge of the display panel 100, and the other surface is fixedly connected with the transparent protective layer 200. The display panel 100 and the transparent protective layer 200 are formed with a bonding area 900 and a gap area 800. The gap area 800 surrounds the bonding area 900, and the bonding member 300 surrounds the gap area 800.

In this embodiment, the display panel 100 may be an LCD display panel, an LED display panel, or an electronic paper display panel. It can be understood that, various optical films, touch films, and protection films etc. are fit, printed, and adsorbed between the transparent protective layer 200 and the display panel 100, and then connected with the structure described above, which is also considered to belong to a technical solution described in this embodiment. For example, taking an LCD display panel serving as the display panel 100 as an example, a touch film is fit to an upper polarizer, and the touch film is considered to be a part of the display panel 100. The transparent protective layer is fit with the touch film and then is fixedly connected with the display panel, which is also considered to belong to a technical solution described in this embodiment. In addition, an edge, location of an edge, and an edge side described in the present disclosure can be understood as not only absolute physical edges, but also positions at a small distance from the absolute physical edges, such as 2 cm or 3 cm. In addition, the surrounding described in the present disclosure can be understood as forming a complete closed loop, or can also be understood as one having gaps in a small portion.

In this embodiment, the display panel and the transparent protective layer form a bonding area through adsorption. It can be understood that the adsorption can be air adsorption, electrostatic adsorption, homopolar adsorption, or the action of van der Waals force. Preferably, the bonding area is in a vacuum state or a state close to vacuum. It can be understood that the bonding area and the gap area can be observed by eyes or measured by an instrument (such as a glass gap measuring instrument). When the instrument measures that the gap between the display panel and the transparent protective layer is 0 (or close to 0, for example, less than 0.01 mm), it is considered that there is a bonding area, and the instrument measures that the gap between the display panel and the transparent protective layer is greater than 0, it is considered that there is a gap area.

Furthermore, the bonding member 300 forms an edge sealing structure between the edge side of the display panel 100 and the transparent protective layer 200. The bonding member 300, the display panel 100 and the transparent protective layer 200 form a sealed space. The gap area surrounds the bonding area and is located in the sealed space.

In the present disclosure, the sealing structure, the sealing connection and the sealed space are not necessarily absolute seals, that is, it can be understood that there are some cracks, and a small amount of external air can enter or exit from the sealed space. It can be understood that if the display panel and the transparent protective layer maintain or form a bonding area or maintain the relative relationship between the display panel and the transparent protective layer, it is considered that the sealing structure, the sealing connection and the sealed space are sealed.

In this embodiment, even if there are small cracks in the sealing structure, the sealing connection, and the sealed space, and a small amount of air can enter or exit from the sealed space, the display panel and the transparent protective layer can still be maintained or formed with a bonding area by means of adsorption. When the display assembly is placed vertically, since the adsorption between the display panel and the transparent protective layer can prevent or further reduce the entry of air into the sealed space, the adsorption force of the display panel and the transparent protective layer is balanced with a tension of air entering the sealed space, and the bonding area remains stable, that is, the bonding area maintains the same or decreases slowly. When the display panel of the display assembly lies downward (under the downward gravity of the display panel) or is subjected to an external force, due to absolute sealing or existence of a small crack, the flow of air entering or exiting is small, which can cause reverse air resistance. The reverse air resistance and the adsorption force of the display panel and the transparent protective layer can prevent or slow down the change in the relative state between the display panel and the transparent protective layer.

As for the display assembly 10 of this embodiment, because the thickness of the bonding member 300 is small (for example, 0.1 mm to 1 mm, preferably 0.3 mm to 1 mm), which is much smaller than the distance between the display panel and the transparent protective layer 200 in the conventional manner, a relatively stable fixed connection is formed between the display panel 100 and the transparent protective layer 200 by the bonding area 900 and the bonding member, so that the relative movement space between the display panel 100 and the transparent protective layer 200 is very small. Therefore, during the transportation, handling, and movement of the display assembly 10 or the display device manufactured by using the display assembly 10, the probability of the display panel 100 being abraded by the transparent protective layer 200 is significantly reduced.

Furthermore, since the display panel 100 and the transparent protective layer 200 form a sealed space, foreign matters (such as dust) cannot enter the sealed space, and the probability of the display panel 100 being abraded by the foreign matters is significantly reduced.

Moreover, since the display panel 100 and the transparent protective layer 200 form a sealed space, external water vapor cannot enter or a small amount of external water vapor can enter between the transparent protective layer 200 and the display panel. Since the amount of air and water vapor between the transparent protective layer 200 and the display panel is small, no water mist can be formed. Therefore, no water mist is generated on the transparent protective layer 200 or the display panel 100, further improving the display effect.

Moreover, in the display assembly 10 of this embodiment, the bonding member 300 only bonds an edge side of the display panel 100 with the transparent protective layer 200, and the bonding member 300 uses less materials, thereby reducing the manufacturing cost, and simplifying the assembly process.

Moreover, in the display assembly 10 of the present embodiment, the display panel 100 and the transparent protective layer 200 are fixed by adsorption. This fixed relationship is not only relatively stable, but also has better flexibility than rigid fixation such as fitting the whole surface. When the display assembly 10 receives a relatively strong external force, due to the flexible fixation of the display panel 100 and the transparent protective layer 200, the external force subjected to the display panel 100 is reduced, so that the display panel 100 is not easily damaged. And the flexible fixation can allow the display panel 100 to transmit the force, which makes the force impact distributed more uniformly, thereby reducing the probability of damage to pixel units at a stressed position of the display panel 100, and reducing the light leakage phenomenon of the display panel 100.

Furthermore, the transparent protective layer 200 is formed with a first bending portion at the transition between a gap area 800 and the bonding area 900. The first bending portion is bent toward the display panel. The first bending portion is arranged around the bonding area 900. In addition, the display panel is formed with a second bending portion at the transition between the gap area 800 and the bonding area 900. The second bending portion is bent toward the transparent protective layer 200. The second bending portion is arranged around the bonding area 900.

In another embodiment of the present disclosure, the display assembly includes a display panel, a transparent protective layer and a bonding member. The bonding member is arranged around an edge of the display panel. One surface of the bonding member is fixedly connected with the display panel, and the other surface of the bonding member is fixedly connected with the transparent protective layer. The bonding member, the display panel and the transparent protective layer construct a sealed space. In the sealed space, the display panel and the transparent protective layer are mutually adsorbed. It can be understood that air can also enter the sealed space, but the sealed space is absolutely sealed or there is a small gap, and the flow of air newly entering the sealed space is small. Since there is an adsorption between the display panel 100 and the transparent protective layer 200, and air newly entering the sealed space is insufficient to destroy the adsorption between the display panel and the transparent protective layer, the adsorption between the display panel and the transparent protective layer can form a stable fixed connection.

In another embodiment of the present disclosure, the display assembly includes a display panel, a transparent protective layer and a bonding member. The bonding member is arranged around an edge of the display panel. One surface of the bonding member is fixedly connected with the display panel, and the other surface of the bonding member is fixedly connected with the transparent protective layer. The bonding member, the display panel and the transparent protective layer form a sealed space. A thickness of the bonding member makes the display panel and the transparent protective layer bend toward each other due to the van der Waals force. In a state that the display assembly is placed vertically, the van der Waals force between the display panel and the transparent protective layer is balanced with a tension generated by air in the sealed space. The display assembly of this embodiment and the display device produced by using the display assembly largely solve the technical problems of broken display panel, abrasion, and light leakage. It can be understood that, in this embodiment, due to manufacturing process and other reasons, the sealed space is not absolutely sealed, there may be slight gaps, and external air can enter the sealed space, however, since the van der Waals force between the display panel and the transparent protective layer can prevent or to further reduce the entry of air into the sealed space, the van der Waals force between the display panel and the transparent protective layer is balanced with the tension of the air entering the sealed space. For example, when an external force of a certain magnitude (for example, less than 5 times of the gravity of the display panel) is applied to the display panel and the transparent protective layer, the sealed space does not change instantaneously (for example, 1 second), and the display panel and the transparent protective layer cannot be separated instantaneously. Furthermore, due to the action of the van der Waals force, the display panel and the transparent protective layer are formed with a bonding area and a gap area in the sealed space. The gap area surrounds the bonding area, and the bonding member surrounds the gap area.

In another embodiment of the present disclosure, the bonding member 300 of the display assembly 10 surrounds and seals the transparent protective layer 200 and the display panel 100, and is arranged between the transparent protective layer 200 and a peripheral edge of the display panel 100, forming a first fixed connection portion for fixedly connecting the transparent protective layer 200 and the peripheral edge of the display panel 100. The first fixed connection portion, the display panel 100 and the transparent protective layer 200 construct a sealed space. In the sealed space, the transparent protective layer 200 and the display panel 100 are formed with a second fixed connection portion. The transparent protective layer 200 is fixedly connected with the display panel 100 through the first fixed connection portion and the second fixed connection portion. An interspace area is formed on the outer periphery of the second fixed connection portion. The interspace area is arranged around the second fixed connection portion. The first fixed connection portion and the second fixed connection portion allow the display panel 100 and the transparent protective layer 200 more firmly fixed, thus eliminating the relative displacement between the display panel 100 and the transparent protective layer 200. In this embodiment, the second fixed connection portion is a flexible fixed connection, and the second fixed connection portion includes an adhesion area formed by adsorption of the display panel and the transparent protective layer.

As for the display assembly of each embodiment, the thickness of the bonding member is small (for example, in a range of 0.1 mm to 1 mm, preferably 0.3 mm to 1 mm), which is much smaller than the conventional distance between the display panel and the transparent protective layer 200, and a relatively stable fixed connection is formed between the display panel 100 and the transparent protective layer 200 by absorption and the bonding member, so that the relative movement space between the display panel 100 and the transparent protective layer 200 is very small. Therefore, during the transportation, handling, and movement of the display assembly 10 or the display device manufactured by using the display assembly 10, the probability of the display panel 100 being abraded by the transparent protective layer 200 is significantly reduced.

Furthermore, the display panel and the transparent protective layer are formed with a bonding area by mutual adsorption, and the display panel and the transparent protective layer are further fixedly connected through the bonding area. A gap area is further formed between the display panel and the transparent protective layer, and the gap area surrounds the bonding area.

Figure 2:
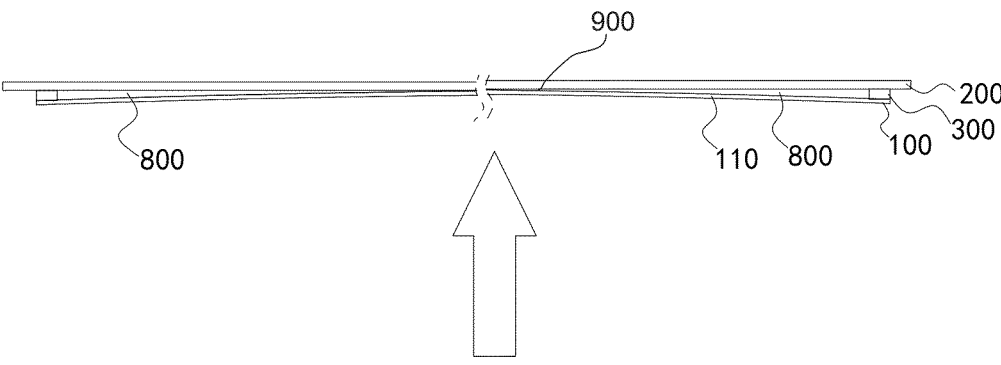
FIG. 2 is a partially sectional view of a display assembly according to an embodiment of the present disclosure.
Figure 3:
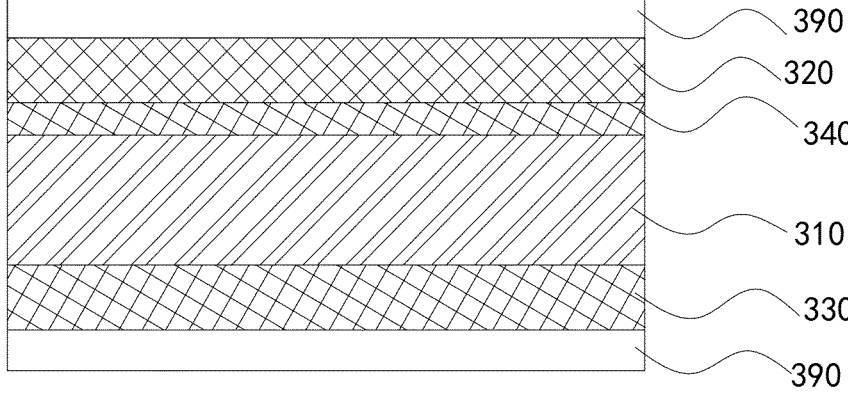
FIG. 3 is a schematic structure diagram of a bonding member according to an embodiment of the present disclosure.

Referring to FIG. 2, the display assembly 10 includes a display panel 100, a transparent protective layer 200 and a bonding member 300. The peripheral edge side of the display panel 100 is fixedly connected with the transparent protective layer 200 through the bonding member 300. That is, one surface of the bonding member 300 is fixedly connected to the peripheral edge of the display panel 100, and the other surface is fixedly connected with the transparent protective layer 200. An edge sealing structure is formed between the transparent protective layer 200 and the edge side of the display panel 100. The display panel 100 and the transparent protective layer 200 are transitionally bent relatively from the edge sealing structure to a middle part of the display panel to form a bent portion 110. The display panel 100 and the transparent protective layer 200 are fixedly connected at the edge of the display panel 100 through the bonding member 300, and form a sealed space. In the sealed space, a gap area 800 is formed between the display panel 100 and the transparent protective layer 200.

It can be understood that air can also enter the sealed space, but the flow of air newly entering the sealed space is small, and the air newly entering the sealed space is insufficient to destroy the structure of the display panel and the transparent protective layer. The display panel and the transparent protective layer can form a stable fixed connection.

In this embodiment, the display panel 100 and the transparent protective layer 200 are transitionally bent relatively from the edge sealing structure to the middle part of the display panel, such that the transparent protective layer 200 is bent toward the display panel 100, or the display panel 100 is bent toward the transparent protective layer 200.

As for the display assembly 10 of this embodiment, since the thickness of the bonding member 300 is small (for example, in a range of 0.1 mm to 1 mm), which is much smaller than the distance between the display panel and the transparent protective layer 200 in the conventional manner, and the display panel 100 and the transparent protective layer 200 are in a relatively stable state, during the transportation, handling, and movement of the display assembly 10 or the display device manufactured by using the display assembly 10, the relative movement space between the display panel 100 and the transparent protective layer 200 is very small, and the probability of the display panel 100 being abraded is significantly reduced.

Furthermore, since there is a sealed space between the display panel 100 and the transparent protective layer 200, foreign matters (such as dust) cannot enter the sealed space, and the probability of the display panel 100 being abraded by the foreign matters is significantly reduced.

Moreover, since the display panel 100 and the transparent protective layer 200 form a sealed space, external water vapor cannot enter between the transparent protective layer 200 and the display panel. Therefore, no water mist is generated on the transparent protective layer 200 or the display panel 100, further improving the display effect.

Moreover, in the display assembly 10 of this embodiment, the bonding member 300 only bonds an edge side of the display panel 100 and an edge side of the transparent protective layer 200, and the bonding member 300 uses less materials, thereby reducing the manufacturing cost, and simplifying the assembly process.

Furthermore, the display panel 100 and the transparent protective layer 200 are formed with a bonding area 900 in the sealed space, and the bonding area 900 makes the display panel 100 and the transparent protective layer 200 form a fitting fixed connection. The bonding area 900 makes the relative state between the display panel 100 and the transparent protective layer 200 more stable. During the transportation, handling, and movement of the display assembly 10 or the display device manufactured by using the display assembly 10, the relative movement space between the display panel 100 and the transparent protective layer 200 is very small, and the probability of the display panel 100 being abraded is significantly reduced.

In each embodiment of the present disclosure, the area of the transparent protective layer 200 is larger than that of the display panel 100, and the edge of the transparent protective layer 200 is not covered with the display panel 100. The bonding area 900 and the second fixed connection portion may have irregular shapes. In addition, the transparent protective layer may be a glass screen or other transparent protective materials, such as transparent resin. "Glass" refers to the cover glass of the screen. In some scenarios, "organic glass" is used, and in some scenarios, "inorganic glass" or other non-glass transparent materials are used. However, it should be noted that "glass" specifically refers to a material that has a certain degree of light transmission and is suitable for serving as a screen protection layer. Similar materials are a kind of "glass" in this embodiment regardless of whether to be chemically glass or not. For example, a kind of "glass" is composed of an inorganic glass substrate and a frosted coating surface, which still belongs to the "glass" referred to in this embodiment.

Because there may be tiny interspaces in the bonding area, it will cause the phenomenon of color halo. In addition, although the amount of air between the transparent protective layer 200 and the display panel 100 is small, and external air cannot enter or only a small amount of air enters, foreign matters such as dust in the air may still exist. These foreign matters may be absorbed by the surfaces of the transparent protective layer or the display panel, forming a black spot phenomenon. Considering the above problems, the present disclosure further proposes the following solutions:

The transparent protective layer 200 can be a glass screen, the glass screen 200 is provided with an insulating point at a position corresponding to the bonding area, and the upper polarizer of the display panel is a low haze polarizer. It can be understood that the microscopic distance between the display panel and the transparent protective layer in the bonding area is greater than half of the wavelength of a visible light due to the insulation point, which eliminates the color halo caused by the reflection and interference of the visible light due to the display panel and the transparent protective layer. In addition, foreign matters cannot be adsorbed to the display panel, so that the black spot phenomenon is avoided. In this embodiment, the height of the insulation point is in a range between 0.03 mm and 0.08 mm.

In the above-mentioned embodiment of the display assembly 10, furthermore, the transparent protective layer is a glass screen. One surface of the glass screen facing the display panel is a smooth surface (<1 μm), and the upper polarizer of the display panel is a high haze polarizer. Generally, the roughness of the high haze polarizer is greater than 3 μm. It can be understood that due to the use of high haze polarizers, the microscopic distance between the display panel and the transparent protective layer in the bonding area is greater than half of the wavelength of a visible light, which eliminates the color halo caused by the reflection and interference of the visible light due to the display panel and the transparent protective layer. In addition, foreign matters cannot be adsorbed to the smooth glass screen, so that the black spot phenomenon is avoided.

By adopting the above-mentioned further solution, the situations of occurring color halo/black spots are significantly reduced, and there are almost no situations in which color halo/black spots occur, which further improves the display effect of the display panel. In addition, it can be understood that adopting the above-mentioned further solution does not affect other technical effects of the present disclosure. Both the insulating point and the high haze polarizer belong to a very microscopic distance and will not affect the fixing effect of the display panel and the transparent protective layer.

In the above-mentioned embodiment of the display assembly 10, the bonding member 300 may be glue or a bonding strip. Optionally, the bonding member 300 is an elastic bonding strip. When the display device is assembled, the display panel 100 and/or the transparent protective layer 200 will squeeze the elastic bonding strip 300 to a certain extent. After the display panel 100 and the transparent protective layer 200 are bonded, air between the display panel 100 and the transparent protective layer 200 is at least partially evacuated, there is a very small amount of air in the sealed space between the display panel 100 and the transparent protective layer 200, and after being bonded, the elastic bonding strip 300 may generate a certain elastic force on the display panel 100 and/or the transparent protective layer 200, and the display panel 100 and the transparent protective layer 200 are permanently firmly fixed.

Figure 4:
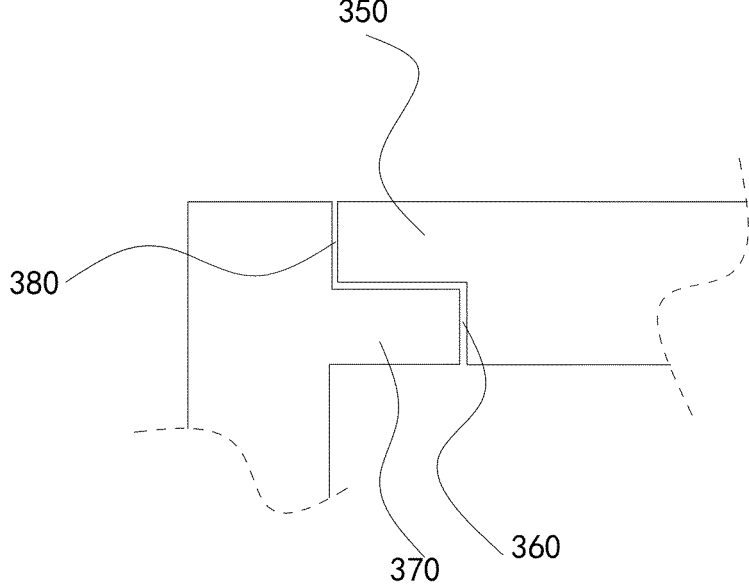
FIG. 4 is a partially schematic diagram of a bonding member according to an embodiment of the present disclosure.

In order to prevent light leakage in the display device, the elastic bonding strip 300 can be a non-transparent strip. After the display panel 100 and the transparent protective layer 200 are bonded by a non-transparent elastic bonding strip, it is possible to effectively prevent the display device from affecting the display effect due to light leakage. As shown in FIG. 4, the non-transparent elastic bonding strip 300 includes a Styrofoam layer 310, a first bonding layer 320, and a second bonding layer 330. The first bonding layer 320 and the second bonding layer 330 are respectively located on both surfaces of the Styrofoam layer 310. The elastic bonding strip 300 is bonded with the transparent protective layer 200 through the first bonding layer 320, and is bonded with the display panel 100 through the second bonding layer 330. The display panel 100 and the transparent protective layer 200 are bonded and fixed through the non-transparent elastic bonding strip 300. The fixing method is simple and the cost of Styrofoam is low, further reducing the cost of bonding between the display panel 100 and the transparent protective layer 200.

To increase the strength of the elastic bonding strip 300 to prevent the elastic bonding strip 300 from being easily broken, the elastic bonding strip 300 further includes a reinforcement layer 340. The reinforcement layer 340 is located between the first bonding layer 320 and the second bonding layer 330. Optionally, the reinforcement layer 340 is located between the first bonding layer 320 and the Styrofoam layer 310, or between the second bonding layer 330 and the Styrofoam layer 310. At least one end portion of the reinforcement layer 340 is exposed relative to a side edge of the display panel 100, or an end portion of the elastic bonding strip 300 is exposed relative to a side edge of the display panel 100. When the assembled display panel 100 and the transparent protective layer 200 need to be separated, the display panel 100 and the transparent protective layer 200 can easily be separated by tearing the exposed reinforcement layer 340, and the separation of the display panel 100 from the transparent protective layer 200 is simple and convenient. The reinforcement layer 340 may be a PET plastic layer.

Figure 5:
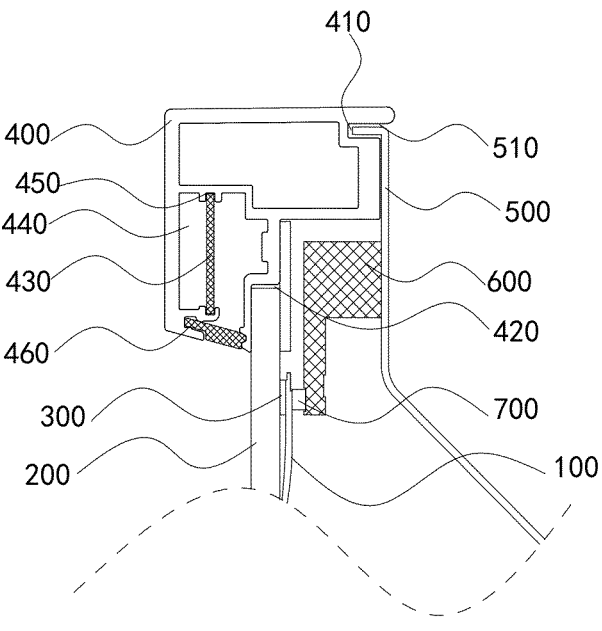
FIG. 5 is a schematic structure diagram of a display assembly according to an embodiment of the present disclosure.

There are at least two elastic bonding strips 300 between the display panel 100 and the transparent protective layer 200, and there are at least two corresponding joint edges between end portions of two adjacent elastic bonding strips 300, so as to prevent the occurrence of the position error of one of two joint edges from affecting the sealing effect. Adjacent elastic bonding strips 300 are jointed by the joint edges. After each of the adjacent bonding members 300 is jointed, the edge side of the display panel 100 and the edge side of the transparent protective layer 200 are sealed. As shown in FIG. 5, as for the two adjacent elastic bonding strips 300, a first convex portion 350 and a first concave portion 360 are provided at an end portion of one of the elastic bonding strips 300, and the other elastic bonding strip 300 is provided with a second convex portion 370 and a second concave portion 380. The first convex portion 350 corresponds to the second concave portion 380, and the first concave portion 360 corresponds to the second convex portion 370. When two adjacent elastic bonding strips 300 are bonded, the convex portion and the concave portion can be correspondingly jointed easily with each other, and it is convenient for the elastic bonding strip 300 to seal edge sides of the display panel 100 and edge sides of the transparent protective layer 200. There can be four elastic bonding strips 300, and each of the elastic bonding strips 300 corresponds to an edge side of the display panel 100 and an edge side of the transparent protective layer 200, respectively. The four elastic bonding strips 300 are respectively bonded with the edge sides of four side edges of the display panel 100 and the edge sides of four side edges of the transparent protective layer 200. During the assembling process of the display device, the four bonding members 300 facilitate accurate bonding on the four side edges of the display panel 100 and the four side edges of the transparent protective layer 200. The four elastic bonding strips 300 have a simple structure and are easy for processing and forming. Moreover, the bent joint edge between the two elastic bonding strips 300 increases the sealing performance between the display panel 100 and the transparent protective layer 200.

The above-mentioned elastic bonding strips 300 is not limited to four. In other embodiments, the number of elastic bonding strips 300 can also be one, two, three, etc., and the shape of the elastic bonding strips 300 is also not limited. The elastic bonding strip 300 can be rectangular, "L"-shaped, etc., and the jointing manner between two adjacent elastic bonding strips 300 is not limited to the convex and concave portions. After being bonded, the elastic bonding strip 300 can form an edge sealing structure between the edge side of the display panel 100 and the transparent protective layer 200.

In order to achieve the touch effect of the display device, a touch film (not shown in the figure) is further provided between the display panel 100 and the transparent protective layer 200. In the bonding area 900, the display panel 100 and the transparent protective layer 200 are both fit with the touch film.

To achieve a better bonding effect and save cost at the same time, the width of the elastic bonding strip 300 is set to be in a range of 3 to 10 mm, and the thickness of the elastic bonding strip 300 in the bonding state is in a range of 0.3 to 1 mm. The thickness of the elastic bonding strip 300 in the bonding state is 50% to 80% of the thickness in the natural state. The thickness of the elastic bonding strip 300 is relatively thin, and the touch effect of the display device will not be affected by the elastic bonding strip 300, so that the user experience of the touch control effect is much superior.

In addition, the thickness of the elastic bonding strip 300 in the bonding state is 50% to 80% of the thickness in the natural state. In this state, the bonding member 300 not only has good stickiness, which makes the display panel 100 and the transparent protective layer 200 has good sealing performance and pasting and fixation, but also maintains good elasticity. When the display assembly 10 is impacted by an external force, the elastic bonding strip 300 can be elastically deformed to reduce the effect of the external force, thereby preventing the display panel 100 from being damaged at the bonding member 300. In addition, the force subjected to the display panel 100 is more uniformly distributed, so that some pixels are prevented from being damaged and causing light leakage. And if the thickness of the elastic bonding strip 300 in the bonding state is greater than 80%, the adhesiveness cannot be guaranteed, and the pasting and fixation between the display panel 100 and the transparent protective layer 200 is poor, which will make the display panel 100 easy to fall off from the transparent protective layer 200. If the thickness of the elastic bonding strip 300 in the bonding state is less than 50%, although the pasting and fixation between the display panel 100 and the transparent protective layer 200 is good, the elastic bonding strip 300 in this state is not sufficiently elastic. When the component 10 is impacted by an external force, the elastic bonding strip 300 cannot be elastically deformed enough to reduce the impact of the external force, which increases the probability of the display panel 100 being damaged at the bonding member 300. Similarly, the display panel 100 is also unable to receive an evenly distributed force, resulting in damage of the display panel at the force bearing point and increasing the probability of light leakage.

For display panels 100 with different sizes, the distance between the bonding member 300 and the edge of the bonding area 900 between the display panel 100 and the transparent protective layer 200 is different, generally in a range of 15 mm to 150 mm. A small amount of air exists between the bonding member 300 and the edge of the bonding area 900 between the transparent protective layers 200 and the display panel 100. The small amount of air will not affect the display effect of the display device.

As shown in FIG. 4, two isolation layers 390 can be further provided on the elastic bonding strip 300. One of the isolation layers 390 is connected with the first bonding layer 320, and the other isolation layer 390 is connected with the second bonding layer 330. The isolation layers 390 isolate the first bonding layer 320 and the second bonding layer 330 from the outside. When the elastic bonding strip 300 is bonded with the display panel 100 and the transparent protective layer 200, first a separation paper connected with the first adhesive layer 320 is peeled off, and the elastic bonding strip 300 is bonded onto the transparent protective layer 200 through the first bonding layer 320, then the separation paper connected with the second bonding layer 330 is peeled off, so that the elastic bonding strip 300 is bonded with the display panel 100. Or, first the separation paper connected with the second bonding layer 330 is peeled off, and the bonding member 300 is bonded onto the display panel 100 through the second bonding layer 330, then the separation paper connected with the first bonding layer 320 is peeled off, so that the elastic bonding strip 300 is bonded with the transparent protective layer 200.

As shown in FIG. 5, the display device provided in this embodiment includes a housing, the transparent protective layer 200 of the display assembly 10 and the housing are fixed to each other, and the display panel 100 of the display assembly 10 is located in the housing. The housing includes a side frame 400, a back plate 500 and a modular rubber frame 600. The side frame 400 and the back plate 500 are fixedly connected to form an accommodation space for placing the display panel 100 and other components of the display device (such as a backlight module). The module rubber frame 600 is fixed to the back plate 500. The area of the transparent protective layer 200 is larger than that of the display panel 100, and the edge of the transparent protective layer 200 is not covered with the display panel 100, so that side edges of the display panel 100 are suspended. One surface of the display panel 100 backed from the transparent protective layer 200 is connected with the module rubber frame 600 through the foam 700.

In the assembled display device, during the transportation and handling of the display device, since the display panel 100 is fixed on the transparent protective layer 200, and the transparent protective layer 200 is a rigid object, the display panel 100 is not prone to shaking, and the gap between the display panel 100 and the transparent protective layer 200 is small, thereby even if the display panel 100 is shaken, the shaking space (moving distance) is small, and the striking force generated by striking the transparent protective layer is small, which reduces the probability of damage of the display panel 100.

Furthermore, because the side edges of the display panel 100 are suspended, the display panel 100 and the module rubber frame 600 are not in contact with each other, thus preventing the display panel 100 from colliding with the module rubber frame 600 and causing broken screen. To further prevent collision between the module rubber frame 600 and the display panel 100, a longitudinal distance between the side edges of the display panel 100 and the housing is greater than 2 mm. Therefore, even if the display panel 100 is shaken during the transportation of the display device, the display panel 100 cannot contact the module rubber frame 600.

Specifically, the frame 400 includes an upper side edge, a lower side edge, a left side edge, and a right side edge. A first slot 410 is provided on the side frame 400. A first clamping portion 510 is provided on the back plate 500. The first slot 410 is matched with the first clamping portion 510. The side frame 400 is connected with and fixed to the back plate 500 through the first slot 410 and the first clamping portion 510. The module rubber frame 600 is connected to the back plate 500 or the frame 400 (preferably is connected with and fixed to the back plate 500). A backlight module (not shown in the figure) is fixed between the back plate 500 and the module rubber frame 600, and the backlight module provides a light source for the display panel. A dustproof foam 700 is provided between the back side of the display panel 100 and the module rubber frame 600, and the foam 700 is used to seal the gap between the display panel 100 and the module rubber frame 600, so as to prevent water, dust, etc. from entering through the back plate 500 and affecting the inside of the display device.

The side frame 400 is a touch frame. A first accommodation groove 420 is provided on the side frame 400. A side edge of the transparent protective layer 200 is located in the first accommodation groove 420. The side frame 400 abuts against the transparent protective layer 200. A touch PCB board 430 and an accommodation space 440 are further provided on the side frame 400. The touch PCB board 430 is located in the accommodation space 440. A sensing element is arranged on the touch PCB board 430. The sensing element can be a sensing reception element or a sensing transmission element. Inside frames 400 at two opposite side edges of the display device, the sensing element on one of side frames 400 is a sensing transmission element, and the sensing element on the other frame 400 is a sensing reception element. The sensing transmission element corresponds to the sensing reception element. The touch PCB board 430 is located on the front side of the display device in the longitudinal direction. Two second slots 450 are provided on the side frame 400. The two second slots 450 are arranged oppositely, and the opposite side edges of the touch PCB board 430 are respectively located on the two second slots 450. The touch PCB board 430 is fixed on the frame 400 through two second slots 450. A light filter part 460 is further provided on the side frame 400. The light filter part 460 is also located on the front side of the display device in the longitudinal direction. After passing through the light filter part 460, the sensing signal of the sensing element is located on the front side of the display device, and the filter part 460 is a light filter bar.

The above-mentioned display assembly can be assembled by the following method. As shown in FIG. 6, the method includes following steps:

S10: making a display panel facing to a transparent protective layer,

S20: evacuating at least part of air between the transparent protective layer and the display panel are, and S30: connecting fixedly a bonding member with the display panel and the transparent protective layer respectively, forming an edge sealing structure between the transparent protective layer and an edge side of the display panel, and forming a sealing structure between the transparent protective layer and an edge side of the display panel, wherein the display panel and the transparent protective layer are adsorbed to form a bonding area and a gap area, the gap area surrounds the bonding area, and the bonding member surrounds the gap area.

In a first embodiment, the method specifically includes following steps:

placing a display panel on a first bearing platform, bonding a first bonding layer of the bonding member with the transparent protective layer, and placing the transparent protective layer on the display panel, under the gravity weight of the transparent protective layer itself or an external force, at least part of a middle area of the transparent protective layer being recessed toward one side of the display panel, and evacuating at least part of air between the transparent protective layer and the display panel, and bonding a second bonding layer of the bonding member with the display panel, and forming a sealing structure between the transparent protective layer and an edge side of the display panel, wherein the display panel and the transparent protective layer are adsorbed to form a bonding area and a gap area, the gap area surrounds the bonding area, and the bonding member surrounds the gap area. In the first embodiment, the display panel is first placed, the transparent protective layer is recessed toward one side of the display panel, and the bonding member is first bonded with the transparent protective layer, and then is bonded with the display panel.

In a second embodiment, the method specifically includes following steps:

placing a display panel on a first bearing platform, bonding a second bonding layer of a bonding member with the display panel, and placing a transparent protective layer on the display panel, under the gravity weight of the transparent protective layer itself or an external force, at least part of a middle area of the transparent protective layer being recessed toward one side of the display panel, and evacuating at least part of air between the transparent protective layer and the display panel, and bonding a first bonding layer of the bonding member with the transparent protective layer, and forming a sealing structure between the transparent protective layer and an edge side of the display panel, wherein the display panel and the transparent protective layer are adsorbed with each other and formed with a bonding area and a gap area, the gap area surrounds the bonding area, and the bonding member surrounds the gap area.

The difference between the second embodiment and the first embodiment is that the bonding member is first bonded with the display panel and then bonded with the transparent protective layer, and the bonding order of the bonding member is different.

In a third embodiment, the method specifically includes following steps:

placing a transparent protective layer on a first bearing platform, bonding a first bonding layer of a bonding member with the transparent protective layer, and placing a display panel on the transparent protective layer, under the gravity weight of the display panel itself or an external force, at least part of a middle area of the display panel being recessed toward one side of the transparent protective layer, and evacuating at least part of air between the transparent protective layer and the display panel, and bonding a second bonding layer of the bonding member with the display panel, and forming a sealing structure between the transparent protective layer and an edge side of the display panel, wherein the display panel and the transparent protective layer are adsorbed with each other and formed with a bonding area and a gap area, the gap area surrounds the bonding area, and the bonding member surrounds the gap area.

In the third embodiment, during assembling, the transparent protective layer is placed first, and then the display panel is placed. The display panel is recessed toward one side of the transparent protective layer, and the order of placing the display panel and the transparent protective layer are different from that of the first and second embodiments.

In a fourth embodiment, the method specifically includes following steps:

placing a transparent protective layer on a first bearing platform, bonding a second bonding layer of a bonding member with a display panel, and placing the display panel on the transparent protective layer, under the gravity weight of the display panel itself or an external force, at least part of a middle area of the display panel being recessed toward one side of the transparent protective layer, and evacuating at least part of air between the transparent protective layer and the display panel, and bonding a first bonding layer of the bonding member with the transparent protective layer, and forming an edge sealing structure between the transparent protective layer and an edge side of the display panel, wherein the display panel and the transparent protective layer are adsorbed with each other and formed with a bonding area and a gap area, the gap area surrounds the bonding area, and the bonding member surrounds the gap area.

In the fourth embodiment, during assembling, the transparent protective layer is placed first, and then the display panel is placed. The display panel is recessed toward the transparent protective layer. The difference from the third embodiment is that the bonding member is first bonded with the display panel, and then bonded with the transparent protective layer.

In a fifth embodiment, the method specifically includes following steps:

placing a display panel on a first bearing platform, bonding a first bonding layer of a bonding member with a transparent protective layer, and placing the transparent protective layer on the display panel, under the gravity weight of the transparent protective layer itself or an external force, the bonding member being pressed and becomes thinner, and evacuating at least part of air between the transparent protective layer and the display pane, and bonding a second bonding layer of the bonding member with the display panel, and forming an edge sealing structure between the transparent protective layer and an edge side of the display panel, wherein the display panel and the transparent protective layer are adsorbed with each other and formed with a bonding area and a gap area, the gap area surrounds the bonding area, and the bonding member surrounds the gap area.

In the fifth embodiment, during assembling, the display panel is placed first, and then the transparent protective layer is placed. The bonding member becomes thinner because of being pressed, so that the air between the transparent protective layer and the display panel is at least partially evacuated. The bonding member is first bonded with the transparent protective layer, and then bonded with the displayed panel, while in the first to fourth embodiments, because the transparent protective layer is recessed toward the display panel or the display panel is recessed toward the transparent protective layer, the air between the transparent protective layer and the display panel is at least partially evacuated.

In a sixth embodiment, the method specifically includes following steps:

placing a display panel on a first bearing platform, bonding a second bonding layer of a bonding member with the display panel, and placing a transparent protective layer on the display panel, under the gravity weight of the transparent protective layer itself or an external force, the bonding member being pressed and becomes thinner, and evacuating at least part of air between the transparent protective layer and the display panel, and bonding a first bonding layer of the bonding member with the transparent protective layer, and forming an edge sealing structure between the transparent protective layer and an edge side of the display panel, wherein the display panel and the transparent protective layer are adsorbed with each other and formed with a bonding area and a gap area, the gap area surrounds the bonding area, and the bonding member surrounds the gap area.

In the sixth embodiment, the display panel is placed first, and then the transparent protective layer is placed. The bonding member becomes thinner because of being pressed, so that the air between the transparent protective layer and the display panel is at least partially evacuated. And in this assembling method, the bonding member is first bonded with the displayed panel, and then bonded with the transparent protective layer.

In a seventh embodiment, the method specifically includes following steps:

placing a transparent protective layer on a first bearing platform, bonding a first bonding layer of a bonding member with the transparent protective layer, and placing a display panel on the transparent protective layer, under the gravity weight of the display panel itself or an external force, the bonding member being pressed and becomes thinner, and evacuating at least part of air between the transparent protective layer and the display panel, and bonding a second bonding layer of the bonding member with the display panel, and forming an edge sealing structure between the transparent protective layer and an edge side of the display panel, wherein the display panel and the transparent protective layer are adsorbed with each other and formed with a bonding area and a gap area, the gap area surrounds the bonding area, and the bonding member surrounds the gap area.

In the seventh embodiment, the transparent protective layer is placed first, and then the display panel is placed. The bonding member is first bonded with the transparent protective layer, the bonding member becomes thinner because of being pressed, and the air between the transparent protective layer and the display panel is at least partially evacuated, and then the bonding member is bonded with the display panel. In this assembling method, the order of placing the display panel and the transparent protective layer are different from that of the fifth and sixth embodiments.

In an eighth embodiment, the method specifically includes following steps:

placing a transparent protective layer on a first bearing platform, bonding a second bonding layer of a bonding member with a display panel, and placing the display panel on the transparent protective layer, under the gravity weight of the display panel itself or an external force, the bonding member being pressed and becomes thinner, and evacuating at least part of air between the transparent protective layer and the display panel, and bonding a first bonding layer of the bonding member with the transparent protective layer, and forming an edge sealing structure between the transparent protective layer and an edge side of the display panel, wherein the display panel and the transparent protective layer are adsorbed with each other and formed with a bonding area and a gap area, the gap area surrounds the bonding area, and the bonding member surrounds the gap area.

In the eighth embodiment, the transparent protective layer is first placed, and then the display panel is placed. The bonding member is first bonded with the display panel, and then, under the gravity weight of the display panel itself or an external force, the bonding member is pressed and becomes thinner, and the air between the transparent protective layer and the display panel is at least partially evacuated, and then the bonding member is bonded with the transparent protective layer. In this assembling method, the bonding order of the bonding member is different from that of the seventh embodiment.

In a ninth embodiment, the method specifically includes following steps:

placing a display panel on a first bearing platform, placing a transparent protective layer on a second bearing platform, and making the display panel relative to the transparent protective layer, under action of an external force, at least part of a middle area of at least one of the display panel and the transparent protective layer, being recessed toward an relative side of both, and evacuating at least part of air between the transparent protective layer and the display panel, and bonding the bonding member with the display panel and the transparent protective layer respectively, and forming an edge sealing structure between the transparent protective layer and the edge side of the display panel, wherein the display panel and the transparent protective layer are adsorbed with each other and formed with a bonding area and a gap area, the gap area surrounds the bonding area, and the bonding member surrounds the gap area.

In the ninth embodiment, the transparent protective layer is relative to the display panel. Under action of an external force, the transparent protective layer is squeezed, so that the middle area of the transparent protective layer is recessed toward one side edge of the display panel. Or, the display panel is squeezed, so that the middle area of the display panel is recessed toward one side of the transparent protective layer. Or, the transparent protective layer and the display panel are squeezed at the same time, so that the transparent protective layer is recessed toward one side of the display panel, and meanwhile, the display panel is also recessed toward one side of the transparent protective layer. And the air between the transparent protective layer and the display panel is at least partially evacuated, and then, the bonding member is used to bond with the display panel and the transparent protective layer, respectively. In the above-mentioned first to eighth embodiments, according to all of the assembling methods, the display panel and the transparent protective layer are bonded horizontally, and in these assembling methods, the transparent protective layer and the display panel can be bonded in a vertical state. In the vertical state, the display panel can further be inclined to one side of the transparent protective layer, or the transparent protective layer can be inclined to one side of the display panel, and then under the action of the external force, the middle area of at least one of the transparent protective layer and the display panel is at least partially recessed toward the relative side of both.

In a tenth embodiment, the display device can also be assembled by the following method, the method specifically includes following steps:

making a display panel relative to a transparent protective layer, bonding a bonding member with the display panel and the transparent protective layer, respectively, evacuating at least part of air between the transparent protective layer and the display panel, sealing an edge side of the display panel with the transparent protective layer, and forming an edge sealing structure between the transparent protective layer and the edge side of the display panel, wherein the display panel and the transparent protective layer are adsorbed with each other and formed with a bonding area and a gap area, the gap area surrounds the bonding area, and the bonding member surrounds the gap area.

In the tenth embodiment, when assembling the display panel and the transparent protective layer, first a bonding member is used to bond the display panel and the transparent protective layer, and an exhaust vent is left between the transparent protective layer and the edge side of the display panel. Then, the air between the transparent protective layer and the display panel is at least partially evacuated by the external force, and then the exhaust vent is closed, and an edge sealing structure is formed between the transparent protective layer and the edge side of the display panel.

In an eleventh embodiment, the method specifically includes following steps:

placing a display panel on a first bearing platform, bonding a first bonding layer of a bonding member with a glass, and placing the glass on the display panel, under the gravity weight of the glass itself or an external force, at least part of a middle area of the glass being bent to one side of the display panel and fit with the display panel, under the gravity weight of the glass itself or an external force, at least part of a middle area being recessed toward one side of the display panel, and evacuating at least part of air between the glass and the display panel, and bonding a second bonding layer of the bonding member with the display panel, and forming an edge sealing structure between the transparent protective layer and an edge side of the display panel, wherein the display panel and the transparent protective layer are formed with a bonding area by fitting at least at a middle part, the display panel and the transparent protective layer are formed with a gap area on the outer periphery of the bonding area, and the gap area is arranged around the bonding area.

In the above-mentioned embodiments, the assembling between the display panel and the transparent protective layer can be completed under the action of its own gravity, or can be completed under the action of an external force, or by using a combination of its own gravity and the external force. When the external force is used, for example, an airbag can be used to squeeze the transparent protective layer or the display panel, or simultaneously squeeze the transparent protective layer and the display panel. External forces can also be used to apply pressure.

It should be noted:

the above-mentioned "middle part" is not an absolute middle part, but refers to an area on the display panel or the transparent protective layer relative to the inner side of the edge sealing structure, the above-mentioned "the display panel is relative to the transparent protective layer" does not mean absolute opposition, the display panel and the transparent protective layer may be slightly staggered, or the display panel and the transparent protective layer may be slightly inclined at a certain angle, the above-mentioned "first bearing platform" and "second bearing platform" can be flat tables, or can be fixing devices composed of only side edges and capable of fixing the display panel or the transparent protective layer, the above-mentioned "first, second, third . . . " are only used to distinguish names, and do not represent concrete quantities and orders.

The above-mentioned "the relative side of both" refers to a side where the display panel and the transparent protective layer are close to each other.

An embodiment of the present disclosure further provides an assembling method of a display device, comprising the following steps of: acquiring a display assembly through any one of the above-mentioned methods, placing a display panel of the display assembly in the housing, and fixing a transparent protective layer of the display assembly and the housing to each other, wherein after the transparent protective layer of the display assembly and the housing are fixed to each other, a side edge of the display panel is suspended relative to the housing.

The above are only concrete embodiments of the present disclosure, and the examples of each embodiment can be used with each other except for conflicts, and do not limit the claimed scope of the present disclosure. Any replacements and improvements made on the basis without violating the concept of the present disclosure belong to the claimed scope of the present disclosure.

What is claimed is:

1. A display assembly, comprising: a display panel; a transparent protective layer; and a bonding member, wherein the bonding member is arranged around an edge of the display panel, one surface of the bonding member is fixedly connected with the display panel, another surface of the bonding member is fixedly connected with the transparent protective layer, the display panel and the transparent protective layer form a sealed space including a bonding area and a gap area, the transparent protective layer is formed with a bending portion at transition between the gap area and the bonding area, the bonding area is in a vacuum state, the gap area surrounds the bonding area, and the bonding member surrounds the gap area, wherein a distance between the transparent protective layer and the display panel is less than 0.01 mm in the bonding area, and a distance between the transparent protective layer and the display panel is more than 0.01 mm in the gap area.

2. The display assembly according to claim 1, wherein the bonding area is formed by adsorption between the display panel and the transparent protective layer.

3. The display assembly according to claim 2, wherein the bonding area is formed by at least one of electrostatic adsorption or polar adsorption between the display panel and the transparent protective layer.

4. The display assembly according to claim 1, wherein a distance between the display panel and the transparent protective layer is zero at the bonding area.

5. The display assembly according to claim 1, wherein the bonding member comprises a bonding strip, and a thickness of the bonding strip in a bonding state is in a range of 0.3 mm to 1 mm.

6. The display assembly according to claim 1, wherein the transparent protective layer comprises a glass screen, an insulation point is provided at a part of the glass screen corresponding to the bonding area.

7. The display assembly according to claim 1, wherein the transparent protective layer comprises a glass screen, one surface of the glass screen facing the display panel comprises a smooth surface.

8. The display assembly according to claim 1, wherein the bonding member is fixedly connected with the transparent protective layer and the display panel to form a first fixed connection portion, the transparent protective layer and the display panel form a second fixed connection portion in the bonding area, the transparent protective layer comprises a glass screen, and the glass screen and the display panel are connected by the first fixed connection portion and the second fixed connection portion.

9. The display assembly according to claim 2, wherein an adsorption force of the display panel and the transparent protective layer is balanced with a tension of air entering the sealed space, and the bonding area remains stable.

10. A display assembly, comprising a display panel; a transparent protective layer; and a bonding member, wherein the bonding member is arranged around an edge of the display panel, one surface of the bonding member is fixedly connected with the display panel, another surface of the bonding member is fixedly connected with the transparent protective layer, and wherein the bonding member, the display panel and the transparent protective layer form a sealed space, and in the sealed space, the display panel and the transparent protective layer are mutually adsorbed, wherein the sealed space comprises a bonding area and a gap area, the transparent protective layer is formed with a bending portion at transition between the gap area and the bonding area, the bonding area is in a vacuum state, the gap area surrounds the bonding area, a distance between transparent protective layer and the display panel is less than 0.01 mm in the bonding area, and a distance between the transparent protective layer and the display panel is more than 0.01 mm in the gap area.

11. A display assembly, comprising a display panel; a transparent protective layer; and a bonding member, wherein the bonding member is arranged between the transparent protective layer and an edge of the display panel, and at the edge of the display panel to form a first fixed connection portion for fixedly connecting the display panel and the transparent protective layer, the first fixed connection portion forms a sealed space for the display panel and the transparent protective layer, and wherein in the sealed space, the transparent protective layer and the display panel are formed with a second fixed connection portion, the sealed space comprises a bonding area and a gap area, the transparent protective layer is formed with a bending portion at transition between the gap area and the bonding area, the bonding area is in a vacuum state, the gap area is formed on the outer periphery of the second fixed connection portion, and the gap area is arranged around the second fixed connection portion, wherein a distance between the transparent protective layer and the display panel is less than 0.01 mm in the bonding area, and a distance between the transparent protective layer and the display panel is more than 0.01 mm in the gap area.

12. The display assembly according to claim 11, wherein the second fixed connection portion comprises an adhesion area formed by adsorption of the display panel and the transparent protective layer.

13. A display assembly, comprising a display panel; a transparent protective layer; and a bonding member, wherein one surface of the bonding member is fixedly connected to an edge of the display panel, another surface is fixedly connected with the transparent protective layer, and a sealing structure is formed between the transparent protective layer and the edge of the display panel, and wherein the display panel and the transparent protective layer are relatively bent from the sealing structure to a middle part of the display panel to form a bending portion, and the display panel and the transparent protective layer form a sealed space within the edge sealing structure, wherein the sealed space comprises a bonding area and a gap area, the gap area surrounds the bonding area, the bending portion is transition between the gap area and the bonding area, a distance between the transparent protective layer and the display panel is less than 0.01 mm in the bonding area, and a distance between the transparent protective layer and the display panel is more than 0.01 mm in the gap area.

14. The display assembly according to claim 13, wherein in the sealed space, the display panel and the transparent protective layer are formed with a bonding area by adsorption, and the gap area surrounds the bonding area.

15. A display assembly, comprising a display panel; a transparent protective layer; and a bonding member, wherein the bonding member is arranged around an edge of the display panel, one surface of the bonding member is fixedly connected with the display panel, another surface of the bonding member is fixedly connected with the transparent protective layer, and wherein the bonding member, the display panel and the transparent protective layer form a sealed space, a thickness of the bonding member makes the display panel and the transparent protective layer bend toward each other due to van der Waals force, and the van der Waals force between the display panel and the transparent protective layer is balanced with a tension generated by air in the sealed space, wherein the sealed space comprises a bonding area and a gap area, the bending portion is transition between the gap area and the bonding area, the bonding area is in a vacuum state, the gap area surrounds the bonding area, a distance between the transparent protective layer and the display panel is less than 0.01 mm in the bonding area, and a distance between the transparent protective layer and the display panel is more than 0.01 mm in the gap area.

16. The display assembly according to claim 1, wherein the display panel includes a touch film, and in the bonding area, the transparent protective layer and the touch film are fitted with each other.

17. The display assembly according to claim 1, wherein the bonding member at least includes a Styrofoam layer, a first bonding layer, and a second bonding layer; the first bonding layer and the second bonding layer are respectively located on two surfaces of the Styrofoam layer, and the bonding member is bonded with the transparent protective layer through the first bonding layer, and is bonded with the display panel through the second bonding layer.

18. The display assembly according to claim 17, wherein the bonding member further includes a reinforcement layer, and the reinforcement layer is located between the first bonding layer and the second bonding layer.

19. The display assembly according to claim 18, wherein at least one end portion of the reinforcement layer opposite to a side edge of the display panel is exposed.

20. The display assembly according to claim 1, wherein the bonding member is a non-transparent bonding strip.

21. The display assembly according to claim 1, wherein a thickness of the bonding member in a bonding state is in a range of 50% to 80% of the thickness in a natural state.

22. The display assembly according to claim 1, wherein there are at least two bonding members, and at least two segments of corresponding joint edges are provided between end portions of two adjacent bonding members.

23. A display device, comprising a display assembly claimed in claim 1 and a housing, wherein the transparent protective layer of the display assembly and the housing are fixed to each other, and the display panel of the display assembly is located in the housing.

24. The display device according to claim 23, wherein a side edge of the display panel is suspended.

25. The display device according to claim 23, wherein the housing includes a side frame, a back plate, and a module rubber frame, wherein the back plate and the side frame are connected and fixed to each other, wherein the side frame is provided with a first accommodating groove for fixing the transparent protective layer, the transparent protective layer and the display panel are arranged between the side frame and the back plate, and wherein a backlight module is provided in the back plate, and the module rubber frame is configured to fix the backlight module on the back plate.

26. The display device according to claim 25, wherein a longitudinal distance of a side edge of the display panel relative to the housing is greater than 2 millimeters.

27. The display device according to claim 26, wherein a foam for dust prevention is provided between the display panel and the module rubber frame.

28. An assembling method of a display assembly, comprising following steps:
  placing a display panel and a transparent protective layer face to face;
  evacuating at least part of air between the transparent protective layer and the display panel; and
  connecting fixedly a bonding member with the display panel and the transparent protective layer respectively, and forming a sealing structure between the transparent protective layer and an edge of the display panel, wherein the display panel and the transparent protective layer are adsorbed with each other and formed with a bonding area and a gap area, the transparent protective layer is formed with a bending portion at transition between the gap area and the bonding area, the bonding area is in a vacuum state, the gap area surrounds the bonding area, and the bonding member surrounds the gap area, wherein a distance between the transparent protective layer and the display panel is less than 0.01 mm in the bonding area, and a distance between the transparent protective layer and the display panel is more than 0.01 mm in the gap area.

29. The assembling method of the display assembly according to claim 28, comprising following steps of:
  placing the display panel on a first bearing platform;
  bonding a first bonding layer of the bonding member with the transparent protective layer, and placing the transparent protective layer on the display panel;
  under the gravity weight of the transparent protective layer itself or an external force, at least part of a middle area of the transparent protective layer being recessed toward one side of the display panel, and evacuating at least part of the air between the transparent protective layer and the display panel; and bonding a second bonding layer of the bonding member with the display panel, and forming a sealing structure between the transparent protective layer and the edge of the display panel, wherein the display panel and the transparent protective layer are adsorbed with each other and formed with a bonding area and a gap area, the gap area surrounds the bonding area, and the bonding member surrounds the gap area.

30. The assembling method of the display assembly according to claim 28, comprising following steps of:

placing the transparent protective layer on a first bearing platform;

bonding a first bonding layer of the bonding member with the transparent protective layer, and placing the display panel on the transparent protective layer;

under the gravity weight of the display panel itself or an external force, at least part of a middle area of the display panel being recessed toward one side of the transparent protective layer, and evacuating at least part of the air between the transparent protective layer and the display panel; and bonding a second bonding layer of the bonding member with the display panel, and forming a sealing structure between the transparent protective layer and the edge of the display panel, wherein the display panel and the transparent protective layer are adsorbed with each other and formed with a bonding area and a gap area, the gap area surrounds the bonding area, and the bonding member surrounds the gap area.

31. The assembling method of the display assembly according to claim 28, comprising following steps of:

placing the transparent protective layer i on a first bearing platform;

bonding a second bonding layer of the bonding member with the display panel, and placing the display panel on the transparent protective layer;

under the gravity weight of the display panel itself or an external force, at least part of a middle area of the display panel being recessed toward one side of the transparent protective layer, and evacuating at least part of the air between the transparent protective layer and the display panel; and bonding a first bonding layer of the bonding member with the transparent protective layer, and forming a sealing structure between the edge of the display panel and an edge side of the transparent protective layer, wherein the display panel and the transparent protective layer are adsorbed with each other and formed with a bonding area and a gap area, the gap area surrounds the bonding area, and the bonding member surrounds the gap area.

32. An assembling method of a display assembly, comprising following steps:

making a display panel relative to a transparent protective layer;

bonding a bonding member with the display panel and the transparent protective layer, respectively;

evacuating at least part of air between the display panel and the transparent protective layer, sealing an edge side of the display panel with the transparent protective layer are sealed, and forming a sealing structure between the transparent protective layer and the edge of the display panel, wherein the display panel and the transparent protective layer are formed with a bonding area and a gap area, the transparent protective layer is formed with a bending portion at transition between the gap area and the bonding area, the bonding area is in a vacuum state, the gap area surrounds the bonding area, and the cohering member surrounds the gap area, wherein a distance between the transparent protective layer and the display panel is less than 0.01 mm in the bonding area, and a distance between the transparent protective layer and the display panel is more than 0.01 mm in the gap area.

33. An assembling method of a display device, comprising following steps of: acquiring a display assembly claimed in claim 28; placing a display panel of the display assembly in a housing, and fixing a transparent protective layer of the display assembly and the housing to each other.

34. The assembling method of the display assembly according to claim 33, wherein after the transparent protective layer of the display assembly and the housing are fixed to each other, a side edge of the display panel is suspended relative to the housing.

* * * * *